United States Patent [19]
Johnson

[11] 3,895,645
[45] July 22, 1975

[54] FLUID LEVEL CONTROL VALVE

[75] Inventor: Dwight N. Johnson, Anaheim, Calif.

[73] Assignee: JH Industries, Inc., Santa Ana, Calif.

[22] Filed: Mar. 9, 1973

[21] Appl. No.: 339,548

[52] U.S. Cl. .................. 137/403; 137/414; 251/46
[51] Int. Cl. ............................................ F16k 31/34
[58] Field of Search ........... 137/386, 403, 406, 412, 137/413, 414; 251/45, 46; 181/33 S

[56] References Cited
UNITED STATES PATENTS

| | | | |
|---|---|---|---|
| 2,685,301 | 8/1954 | Dreier............................. | 137/403 X |
| 3,586,017 | 6/1971 | Walters........................... | 137/403 X |
| 3,693,649 | 9/1972 | Gordon et al..................... | 137/414 |

*Primary Examiner*—Martin P. Schwadron
*Assistant Examiner*—David R. Matthews
*Attorney, Agent, or Firm*—Mason, Kolehmainen, Rathburn & Wyss

[57] ABSTRACT

A valve for controlling the level of water in a toilet flush tank includes a body and cover having interfacing surfaces defining a valve chamber and a diaphragm chamber. A valve seat in the valve chamber communicates with a water inlet by way of a projection integral with the body adapted to extend through the flush tank water inlet opening to mount the housing in a normally submerged position. A diaphragm is held in the diaphragm chamber between the cover and body, and a flexible valve member is held in the valve chamber between the cover and body. An air passage defined in part by the projection vents the diaphragm chamber to atmosphere through the flush tank floor, and liquid pressure is communicated through the cover to the opposite side of the diaphragm. The water inlet passage extends to the center of the valve seat, which is surrounded by a valving surface having a number of segment shaped outlet ports communicating with water outlet passages in the valve body. Movement of the diaphragm in response to changes in water level results in opening and closing of the valve member to maintain the desired water level.

29 Claims, 6 Drawing Figures

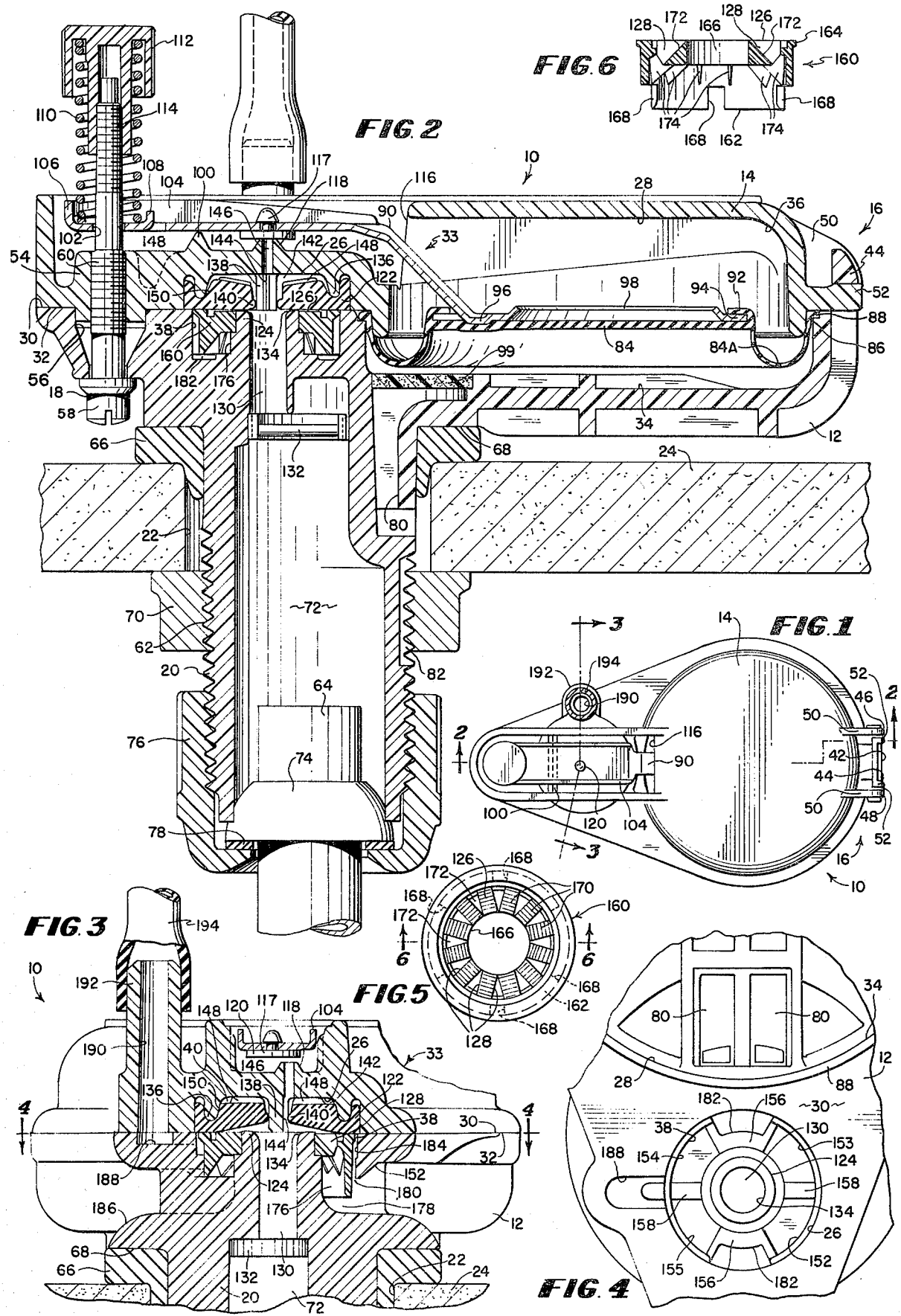

FLUID LEVEL CONTROL VALVE

The present invention relates to improvements in valves and more specifically to fluid level control valves such as water level control valves for toilet flush tanks.

Valves used in the past for controlling the water level in toilet flush tanks have typically been of the so-called ball cock type wherein a float is used to control the operation of the valve. An example of a device of this character may be found in U.S. Pat. No. 3,429,333 - Schoepe et al. Other valves have been provided utilizing a diaphragm for comparing pressure resulting from water level with atmospheric pressure. One example of this type of valve may be found in U.S. Pat. No. 2,620,818 - Symmons. Both the ball cock valve and the diaphragm type valve exemplified in these patents suffer from the disadvantage that some of the valve structure is necessarily located at or near the top of the tank resulting in expense, complexity, and unsightly appearance.

Valves have also been provided wherein atmospheric pressure is referenced through the wall of the flush tank rather than through a tube leading to the top of the tank. Examples of devices of this character are to be found in U.S. Pat. Nos. 2,442,927 - Horvath and No. 2,685,301 - Dreier. Such devices have been subject to several difficulties, and have required the use of siphon tubes extending to the upper regions of the flush tank and therefore have not overcome the above noted disadvantages of ball cock valves.

In addition, water level control valves developed heretofore have typically been subject to other difficulties including noise in use due to high water velocities and cavitation, and slowness in operation. Known devices have also been extremely complex and expensive to manufacture and assemble. Moreover, currently available water level control valves are unreliable over long periods of use and are difficult to repair and replace.

Among the important objects of the present invention are to provide a water level control valve for controlling the level of water in toilet flush tanks characterized by simplicity in design, low noise in use, and rapid operation, and to provide a water level control valve for this purpose overcoming disadvantages of known devices. Other objects of the present invention are to provide an improved valve structure which is quiet, positive and reliable in operation, and to provide a pilot operated valve of simple and reliable character.

In accordance with the above and other objects and advantages of the present invention, there is provided valve apparatus including a housing formed of a body member and a cover member having interfacing generally flat surfaces. A valve chamber and a diaphragm chamber are defined between the surfaces, and the body member includes a valve seat generally in the plane of the interfacing surfaces. The body is provided with an integral projection adapted to extend through the water inlet of a toilet flush tank and to provide a water inlet passage for admitting water to the valve seat and an air passage for providing a path to atmosphere from the diaphragm chamber. A flexible diaphragm and a flexible valve member are peripherally clamped in the diaphragm chamber and valve chamber respectively between the body member and the cover member. The diaphragm chamber is exposed to fluid pressure through the cover member, and diaphragm movements result in movement of the valve member toward and away from the valve seat in response to changes in water level.

An important feature of the invention resides in the provision of a novel valve arrangement including a valving surface surrounding the valve seat and including a number of outlet ports having increasing widths in a radially outward direction. A pressure chamber is defined in the cover member opposite the valve seat and outlet ports, and a restricted passage in the valve member introduces inlet pressure to the pressure chamber. A pilot passage leads through the cover from the pressure chamber to the exterior of the housing, and a pilot valve controlled in accordance with diaphragm movement opens and closes the pilot passage in order to raise and lower the valve member. The valve member opens and closes with a "rolling" or "peeling" action in order to provide for reliable, quiet, and readily controllable operation.

Another aspect of the present invention relates to the simplicity of the valve structure. The cover member and body member are provided with a releasable hinge arrangement for hinging the two members together at one peripheral location. A single fastener disposed at a spaced location serves to hold the cover and body members together. In addition, a lever is provided for operating the pilot valve and includes one end connected in novel fashion to the diaphragm and another end adjustably and resiliently supported on the single screw member.

In order to provide for quiet operation and relatively high flow rates, the flow path through the valve apparatus is provided with a series of several flow restriction regions. Each region is of approximately equal area so that the problems of cavitation and noise due to high water velocities are minimized. In addition, the housing is provided with an annular, skirt-like wall, and fluid flowing from the valve is directed against this wall to channel the fluid smoothly and evenly from the valve and over a wall of the flush tank.

The above and other objects and advantages of the invention may be best understood from the following detailed description of the embodiment of the present invention illustrated in the drawings, wherein:

FIG. 1 is a top view of a fluid level control valve embodying the features of the present invention;

FIG. 2 is an enlarged vertical sectional view of the valve of FIG. 1 taken along the line 2—2 of FIG. 1 and illustrating the valve mounted in position in the floor of a toilet flush tank;

FIG. 3 is an enlarged sectional view of the valve of FIG. 1 and illustrating the valve in the open position;

FIG. 4 is an enlarged, fragmentary top view illustrating portions of the body of the valve with the cover and other structure removed;

FIG. 5 is a top view of the diffuser insert member of the valve of FIG. 1; and

FIG. 6 is a sectional view of the diffuser of FIG. 5.

Having reference now to the drawings, there is illustrated a fluid level control valve constructed in accordance with the principles of the present invention and designated as a whole by the reference numeral 10. In accordance with important features of the present invention, the housing of the valve 10 is formed in simple and economical fashion from two components, a body 12 and a cover 14, held together in simple fashion by means of a releasable hinge structure 16 and a single fastener 18. The body 12 includes an integral projection 20 adapted to extend through the water inlet opening 22 (FIG. 2) in the bottom wall or floor 24 of a toilet flush tank, only a fragmentary portion of which is illustrated in FIGS. 2 and 4. A valve chamber 26 and a diaphragm chamber 28 are defined by aligned recesses in interfacing walls 30 and 32 of the body member and cover member respectively. Water is channelled to the valve chamber 26 and the diaphragm chamber 28 is vented to atmosphere through the water inlet 22 in the tank floor 24 by means of the projection 20, and as a result the entire structure of the valve 10 is disposed in a desirable, out of the way location adjacent the bottom of the toilet flush tank. Important features of the invention are embodied in a novel valve structure generally designated at 33 associated with the valve chamber 26 and serving to control the flow of water through the valve body 10 into the tank.

Proceeding now to a more detailed description of the valve 10, both the body 12 and cover 14 are preferably formed of a molded plastic material having the advantages of economy in manufacture and freedom from fouling when used with water. The body 12 includes a first, generally circular cavity 34, while the cover 14 includes a similar, aligned cavity 36, and the cavities 34 and 36 cooperate to define the diaphragm chamber 28. The body 12 also includes a generally circular cavity 38 spaced from the cavity 34, and the cover 14 includes an aligned cavity 40 of similar configuration. The cavities 38 and 40 cooperate to define the valve chamber 26.

In order to simplify assembly of the valve 10, and in accordance with one feature of the invention, the body 12 and cover 14 are hinged together in a clam shell-like configuration by means of the releasable hinge structure 16. With reference more particularly to FIGS. 1 and 2, the end of the body 12 adjacent the diaphragm chamber 28 and opposite the valve chamber 26 is provided with an upwardly directed extension 42 terminating at its upper end in a bar segment 44 having a width greater than the lower portion of the extension 42. The cover 14 includes a pair of spaced projections 46 and 48 each including a vertical wall portion 50 and an inwardly directed, generally horizontal shelf portion 52.

In assembly of the body 12 and cover 14, the extension 42 of the body is located between the walls 50 of the projections 46 and 48 of the cover, and the bar portion 44 is lowered against the shelf segments 52. In this position the body 12 and cover 14 are hinged in the nature of a clam shell, and the cover can be pivoted down against the body with the cover wall 32 abutting the interfacing body wall 30. At this point, and as best shown in FIG. 2, the engagement between the bar portion 44 and the shelf portions 52 serves to hold the cover 14 tight against the body 12 in the region of the hinge structure 16.

In order to complete the assembly of the cover 14 to the body 12, only the single fastener 18 is necessary. More specifically, with reference once again to FIG. 2, the wall 32 of the cover 14 includes an internally threaded boss 54, the lowermost portion of which projects slightly downward from the wall 32. The body 12 includes an opening 56 aligned with the boss 54. Fastener 18 is in the form of a screw fastener having a head 58 and a threaded portion 60. In assembly of the parts 12 and 14, the boss 54 enters the opening 56 and performs a keying function to assure proper alignment between the parts. The fastener 18 is then inserted through the opening 56 and threaded into place in the boss 54.

An important advantage of the valve 10 of the present invention is that the valve is located at the bottom of the tank and includes no structure at or near the top of the tank. In order to mount the valve 10, the projection 20 extends downwardly from the main portion of the body 12 and is generally aligned with the valve chamber 26. Preferably the projection 20 is generally circular in cross section and includes a threaded portion 62 for mounting the valve 10 to the bottom of the flush tank and for establishing a connection between the valve 10 and a water supply conduit 64 (FIG. 2).

In order to prevent leakage from the flush tank through the inlet opening 22, a resilient sealing gasket 66 surrounds the projection 20 and is captured between the floor or lower wall 24 of the tank and a horizontal, annular sealing wall 68 of the body 12 surrounding the projection 20. After the gasket 66 has been placed in position and the projection 20 has been inserted from the top through the opening 22, a mounting nut 70 is threaded over the threaded portion 62 of the projection 20 in order firmly to hold the valve 10 in place.

Projection 20 includes a central water supply passageway 72 into which the water supply conduit 64 is received. A compressible gasket 74 surrounds conduit 64, and a coupling nut 76 is threaded over the gasket 74 onto the threaded portion 62 of projection 20. A washer 78 permits rotation of the coupling nut 76, and the nut 76 is tightened to compress the gasket 74 between the end portion of the projection 20 and the outer surface of the conduit 64.

In addition to serving the functions of mounting the valve 10 in the tank and communicating water to the valve chamber 26, the projection 20 also provides a path for admitting atmospheric pressure from the exterior of the tank to the diaphragm chamber 28. More specifically, the body 12 includes a pair of side-by-side passages 80 of similar shape, each extending from the bottom of the cavity 34 to a point along the projection 20 aligned with the inside of the tank opening 22. As shown in FIG. 2, the projection 20 is received with substantial clearance within the opening 22 providing a path for air to flow between the passages 80 and the bottom of the opening 22 adjacent the mounting nut 70. Clearance also is present between the threads of the mounting nut 70 and the threaded portion 62 of the projection 20 so that air may flow through the threads to communicate the diaphragm chamber 28 with atmosphere. In order to assure that the passage of air is not prevented by pipe joint compounds or other substances used in mounting of the valve 10, a notch or groove 82 is provided in the threaded portion 62.

The level of water within the tank is sensed by means of a diaphragm 84 located within the diaphragm chamber 28 and dividing the diaphragm chamber into a lower portion which is exposed to atmosphere through the passages 80 and an upper portion which is exposed to the pressure of fluid within the tank. The outer periphery of the diaphragm 84 is provided with a lip 86 captured in sealing relation between the body 12 and cover 14. In the illustrated arrangement, a shoulder 88 is provided in the wall 30 of the body to compress and expand the lip 86 against the surrounding surfaces.

In order to control the flow of water through the valve 10 in response to changes of water level within the tank, the diaphragm 84 controls the movement of an operating lever 90. In accordance with the invention, the lever 90 is preassembled to the diaphragm 84 in a novel fashion allowing the diaphragm to be continuous and unapertured throughout its entire extent while the lever remains firmly attached to the diaphragm under conditions when the diaphragm is deflected or pressurized.

More specifically, inwardly of the peripheral lip 86 of the diaphragm 84 there is provided a second lip 92 which in the illustrated embodiment of the invention extends around a generally circular path complementary in shape to the circular diaphragm chamber 28. The lip 92 forms an inwardly directed mouth or slot 94. Received within the slot 94 is a diaphragm-engaging end portion 96 of the lever 90 having a somewhat plate-like configuration and a shape similar to that of the lip 92. The end of the lever is captured within the slot 94 and movement of the diaphragm 84 is translated to the lever 90.

In addition, the central portion of the diaphragm engaging portion 96 of the lever 90 is angled away from the diaphragm and includes an opening 98. This structure permits deflection of the central portion of the diaphragm 84 relative to the lever 90 when the diaphragm is pressurized. Such deflection draws the lip 92 even more tightly around the diaphragm engaging portion 96 of the lever so that under conditions of pressure there is no tendency for the lever 90 to be released from the diaphragm 84.

The diaphragm 84 is relatively unstressed at normal operating pressures due to the provision of a slack portion 84A adjacent its periphery between the lips 86 and 92. Thus the possibility of diaphragm rupture or leakage is minimal. However, in order to prevent any possibility of damage from water leakage through the air vent passages 80, and in accordance with a feature of the invention, there is provided an anti-spill element 99 (FIG. 2) supported over the entrances of passages 80 within the diaphragm chamber 28. Element 99 is formed of a material permeable to air and substantially impermeable to water. One suitable material is a non-hydrophilic porous plastic such as a linear, high density, porous polyethylene of the type sold under the trade name "Vyon" by the Atlas Minerals and Chemicals Division: ESB Incorporated, of Mertztown, Pa.

In accordance with an aspect of the present invention, the number of parts required for the valve 10 is reduced and the assembly of the valve is simplified by utilizing the screw fastener 18 not only for holding the body 12 and cover 14 together but also for adjustably supporting the operating lever 90. The lever 90 is pivoted on a knife-edge pivot projection 100 traversing the upper surface of the cover 14 adjacent the boss 54. The extremity of the lever 90 opposite the diaphragm engaging portion 96 is provided with an opening 102 received over the screw fastener 18 above the threaded portion 60. A peripheral stiffening flange 104 is provided at the edges of the portion of the lever overlying the valve chamber 26, and this flange continues around the extremity of the lever to provide a spring retaining segment 106. A further spring retaining function is provided by a tab 108 struck out of the lever opposite the flange 106. The lever 90 is biased in opposition to the pressure differential acting on the diaphragm 84 by means of a spring 110 held between the spring retaining portion 106 and an adjustment cap 112 threaded onto a threaded portion 114 of the screw fastener 18. As will appear in greater detail hereinafter, the cap 112 is used to adjust the valve 10 to maintain a desired water level within the flush tank.

To permit the diaphragm 84 to move in response to changes in water level within the tank, water pressure is communicated to the diaphragm chamber 28 by way of a pressure sensing passage 116 in the cover 14. In accordance with a feature of the invention, the lever 90 extends from the diaphragm chamber through the pressure sensing passage 116 thereby simplifying the structure of the cover 14.

In order to control the flow of water through the valve 10, there is provided a pilot valve 117 controlled by movement of the lever 90 in response to changes in water level. The cover 14 includes an upwardly directed pilot valve seat 118 disposed beneath the lever 90 between the pivot projection 100 and the passage 116 leading to the diaphragm chamber 28. A pilot valve member 120, preferably formed of resilient material to form a good seal with the seat 118, is carried in a hole in the lever 90 and overlies the seat 118. As can best be seen from a comparison of FIG. 2 and FIG. 3, the valve member 120 is supported off-center relative to the valve seat 118 and is slightly loose on the lever 90 in order to permit the valve member to rotate during repeated openings and closings to distribute wear around the member 120 and minimize cutting of the seat 118 into the valve member 120. positive closing is assured because the flat upper surface of the valve member 120 abuts against the flat lower surface of the lever 90.

Opening and closing of the pilot valve 117 serves to regulate the opening and closing of the main valve assembly 33 in order to permit the flow of water through the water level control valve 10. In general the valve assembly 33 includes a valve member 122 cooperating with a valve seat 124 surrounded by a valving surface 126 in which are located a number of outlet ports 128. In accordance with one important feature of the invention the valve member 122 opens and closes by moving away from and toward the seat 124 and surface 126 with a "peeling" or "rolling" action.

More specifically, the water supply passageway 72 of the projection 20 communicates at its upper end with an inlet passage 130 of predetermined restricted area. In order to prevent the entrance of large contaminants into the valve assembly 33, a filter screen device 132 is mounted with a press fit adjacent the inlet passage 130. The downstream end of the inlet passage 130 comprises an inlet port 134 surrounded by the valve seat 124.

Valve seat 124 is formed integrally with body 12, and seat 124 and valving surface 126 are generally coplanar with the interfacing surfaces 30 and 32 of the body 12 and cover 14. However, in the illustrated arrangement the seat 124 extends very slightly above this plane to assure a good seal against the valve member 122 in the closed position. The valve member 122 is generally annular in shape and is peripherally clamped between the body 12 and cover 14 with its lower surface normally flat against the valving surface 126 and valve seat 124. In order firmly to hold the valve member 122, the cover 14 includes a rib 136 received into an aligned groove formed in the top of the valve member.

When the fluid level within the tank is at the desired level as determined by the bias of spring 110, which in turn is established by the adjustment cap 112, the pilot valve member 120 is sealed against the pilot valve seat 118 by downward movement of the diaphragm 84 due to water pressure. In this condition, the valve member 122 is closed against the valve seat 124, as illustrated in FIG. 2, and no flow is permitted from the inlet passage 130 past the valve seat 124. More specifically, the cover 14 is provided with a downwardly extending shaft-like projection or column 138 sealingly engaged by a radially inwardly extending sealing lip 140 of the valve member 122. The region of the valve chamber 26 above the valve member 122 comprises a pressure control chamber designated by reference numeral 142, and restricted communication is provided between the inlet passage 130 and the chamber 142 by means of a groove or notch 144 in the projection 138. When the inlet of the valve 10 is pressurized, inlet pressure is transmitted through the groove 144 to the pressure control chamber 142. In this condition the outlet ports 128 are at relatively low pressure and the resilient valve member 122 is tightly clamped against the valve seat 124 and valving surface 126 to prevent flow through the valve 10.

Pressure within the pressure control chamber 142 is reduced when the water level within the tank decreases below the desired level. In response to a decrease in water level, the pressure acting downwardly upon the diaphragm 84 is reduced and the spring 110 pivots the lever 90 to lift the pilot valve member 120 from the pilot valve seat 118. A relatively unrestricted pilot passage 146 extends from the pressure control chamber 142 through the pilot valve seat 118 to the exterior of the valve 10, and opening of pilot valve 117 vents the pressure control chamber 142. Since the pilot passage 146 is substantially less restricted to flow than the passage provided by the groove 144, the pressure within the pressure control chamber 142 begins to drop relative to the pressure existing in the inlet passage 130. As a result, the valve member 122 moves to an open position.

In accordance with an important feature of the invention, the valve member 122 moves with a "rolling" or "peeling" action from its closed to its open position. More specifically, in accordance with the invention, and as can best be seen with reference to FIG. 5, each of the outlet ports 128 is segmental in shape and increases markedly in width in a radially outward direction. As a result, when the valve is in the closed position illustrated in FIG. 2, the pressure differential holding the valve closed increases from a minimum near the center of the valve member 122 to a maximum near the periphery of the valve member 122. During opening, as the pressure within the pressure control chamber 142 decreases, the valve member 122 is caused to roll or peel upwardly from the center toward the periphery. When the pressure within the pressure control chamber 142 is at an intermediate level lower than inlet pressure and above the ambient tank pressure, a lifting force exists near the center of the valve member 122. At the same time the outer portion of the valve member remains closed due to the pressure difference between the control chamber pressure and the low outlet port pressure. This provides a desirable and quiet gradual opening of the valve.

When the pressure in chamber 142 drops to the outlet pressure level, the valve member 122 is in the full open position. In this open position, a series of projections or ribs 148 on the upper surface of the valve member 122 within the pressure control chamber 142 serves to space the valve member from the top wall of the pressure control chamber 142 so that pressure within the chamber is freely communicated over the top surface of the valve member 122. During the time that the valve member 122 is open, water flows from the inlet passage 130, over the valve seat 124, radially outwardly under the valve member 122 and downwardly into the outlet ports 128. The force of the flowing water moving against the underside of the valve member 122 assists in holding the valve member 122 in its open position.

When the water level within the tank reaches the desired level, the pressure exerted against the diaphragm 84 is sufficient to overcome the force of the spring 110 and close the pilot valve 117. At this time the pressure within the pressure control chamber 142 increases due to restricted communication with the inlet passage 130 through groove 144 in column 138. This results in closing of the valve assembly 33, and in accordance with the invention the valve member 122 closes with a rolling action which is the reverse of the opening movement.

In order to begin the closing movement of the valve member 122 toward the valving surface 126, the resiliency of the valve member 122 is used to provide an initial bias toward the closed position. This is accomplished in two ways. Firstly, the valve member 122 is preferably molded with an initial over-bias toward the closed position. In other words, prior to mounting within the valve chamber 26, the lower surface of the valve member 122 is not flat, but has a slightly convex shape. For example, in the preferred embodiment of the invention the lower surface of the valve member slopes down from the outside in, at an angle of about 5° to horizontal.

Further to provide an initial closing bias, the valve member 122 includes an annular radially outwardly facing wall 150 which in the closed position of the valve member 122 is spaced from the inner surface of the rib 136. However, when the valve moves to the open position illustrated in FIG. 3, radial interference and compression occurs between the wall 150 and the rib 136. When pressure within the pressure control chamber 142 increases, the body of the valve member 122 adjacent the wall 150 expands to provide an additional initial closing force.

Following the initial closing movement of the valve member 122, the valve member moves to its closed position with a "rolling" action. As obstruction of the outlet ports 128 by valve member 122 begins to cause a controlling pressure drop between the inlet passage 130 and the outlet ports 128, the pressure within the pressure control chamber 142 begins to increase relative to the outlet port pressure. Thus the valve member 122 is gradually clamped shut in an outside-in direction. The outlet ports 128 provide substantial hydraulic radius when the valve member moves toward its closed position. The kinetic energy of the flowing water is dissipated by hydraulic shear, and cavitation noise is minimized.

The projection or column 138 serves several functions in connection with the valve assembly 33. Due to the sealing of lip 140 against the column 138, the necessary isolation is obtained between the inlet passage 130 and the pressure control chamber 142 for opening of the valve. In addition the groove 144 in the column 138 provides a restricted flow path that does not become clogged by debris because the movement of the lip 140 along the column provides a self-cleaning action. Moreover, the column 138 acts to restrict flow from the inlet passage 130 toward the valve seat 124 for a purpose described hereinafter.

One advantage of the valve 10 of the present invention is that it permits a relatively high rate of flow for rapid filling of the tank while reducing noise to a minimum. With reference now more specifically to FIGS. 3 and 4, there are provided a series of four outlet passages 152, 153, 154 and 155 extending downwardly and outwardly from the valve chamber 26 to the exterior of the valve 10. These outlet passages are separated by means of relatively wide ribs 156 and relatively narrow ribs 158. In accordance with the invention, a diffuser member 160 is inserted into the chamber 26 in order to restrict and control flow through the valve 10 and to achieve quiet operation. In the illustrated arrangement the valving surface 126 and outlet ports 128 are provided by diffuser 160, but if desired features of the invention could be embodied in a valve wherein the valving surface and valve seat are both part of the same structure.

Having reference now more specifically to FIGS. 5 and 6, the structure of the diffuser 160 is shown. The diffuser includes an outer annular skirt portion 162 spaced slightly inwardly from an outwardly projecting ledge 164 formed as an extension of the valving surface 126. The center of the diffuser is provided with a circular opening 166 fitting over the outer surface of the valve seat 124. The lowermost portion of the skirt 162 is provided with spaced notches 168 fitting over the ribs 156 and 158 to locate the diffuser within the body 12. The portions of the skirt 162 between the notches 168 extend downwardly into the outlet passages 152, 153, 154 and 155.

The outlet ports 128 in the valving surface 126 are separated from one another by means of a series of radially extending rib members 170. The ports 128 are defined in part by inclined flow deflection surfaces 172 which channel flow entering the ports 128 in a downward and outward direction against the inner surface of skirt 162. Struts 174 are provided to support the rib members 170.

When the diffuser 160 is inserted into the body 12, there is provided an inner, annular outlet chamber 176 located within the skirt 162. Flow through the outlet ports 128 enters this chamber 176, and due to the defelection surfaces 172, a generally toroidal flow pattern is established. This serves to dissipate the kinetic energy of water flowing through the valve 10 and prevents the occurrence of cavitation at the region of the struts 174.

The portions of the diffuser skirt 162 extending into outlet passages 152, 153, 154 and 155 divide the passages into inner discharge ports 178, receiving flow directly from the chamber 176, and outer discharge ports 180. Each relatively wide rib 156 is provided with a recess 182 providing a flow path beneath the associated notches 168 in the skirt 162. This flow enters an outer, annular discharge passage 184 located outside the skirt 162 and within the valve chamber 26.

The majority of the water flowing through the valve 10 exits directly from inner chamber 176, under the lowermost portions of the skirt 162, and through the discharge ports 178. A certain proportion of the flow, however, moves through the recesses 182, into the outer chamber 184, and out of the discharge ports 180. The flow from inner discharge ports 178 is at a substantially higher velocity than the flow from the outer discharge ports 180.

As can be seen in FIG. 3, the body 12 is provided with a generally skirt-shaped, curved, outwardly and downwardly inclined wall 186 disposed beneath the outlet passages 152, 153, 154 and 155 and extendidng toward the lower wall 24 of the tank. Flow is directed from the discharge ports 178 and 180 over the wall 186 in a smooth fashion and is channelled evenly onto and along the tank wall 24. Moreover, flow from the ports 178 at a relatively high velocity is immediately adjacent the wall 186 and the wall 24, while flow of lower velocity from the ports 180 functions in the nature of a buffer layer between the high velocity flow and water in the tank in order to promote the attachment of the primary flow to the contours of the valve and tank floor and to minimize shear turbulence.

Another function of the outer discharge chamber 184 is to provide water for the refill passage of the toilet flush tank. More specifically, the chamber 184 communicates with a passage 188 formed as a recess in surface 30 of the body 12 having inlets flanking one rib 158. Passage 188 communicates with a passage 190 extending upwardly through the cover 14 to a boss 192. A flexible refill tube 194 is attached to the boss 192 and leads to the conventional refill conduit (not shown) of the flush tank. when the valve 10 is opened, water flows through the passages 188 and 190 and tube 194 to the refill conduit.

The flow passages through the valve 10 are designed in accordance with the present invention to minimize noise due to high water velocities and cavitation. This is accomplished by providing a number of substantial flow restrictions in the flow path, each of which has approximately the same area. In the illustrated arrangement the first of these flow restrictions is provided by the mouth of the inlet passage 130. The second flow restriction is provided by the clearance between the end of the column 138 and the entry side of the valve seat 124. The third substantial flow restriction is provided by the clearance between the valve member 122 in its full open position and the outlet side of the valve seat 124. Yet another substantial flow restriction is provided by the aggregate areas of the outlet ports 128. In accordance with the invention, each of these four major flow restriction areas is of approximately equal cross sectional size so that the pressure drop of water flowing through the valve 10 is distributed evenly.

As an example, and without limiting the present invention to any specific dimensions, in a device constructed in accordance with the invention, the inlet of the passage 130 had an area of 0.021 square inch, the flow path into the valve seat 124 had an area of 0.026 square inch, the flow path between the valve member 122 and the valve seat 124 had an area of 0.028 square inch, and the aggregate area of the outlet ports 128 was 0.034 inch.

Although the present invention has been described with reference to the details of the illustrated embodiment, it should be understood that such details should not be taken to limit the invention which is defined in the following claims.

What is claimed and desired to be secured by Letters Patent of the United States is:

1. Apparatus for controlling the level of liquid in a tank having a liquid inlet opening in its floor, said apparatus comprising in combination a housing including a body and a cover having interfacing generally uniplanar surfaces defining a valve chamber and a diaphragm chamber therebetween, said body including a valve seat in said valve chamber generally in the plane of said interfacing surfaces, an integral projection of said body adapted to be received in the liquid inlet opening in the floor of the tank for mounting the housing in a normally submerged position, a liquid inlet passage defined at least in part by said projection and leading to said valve seat, liquid outlet passage means in said housing leading from said valve seat to the exterior of said housing, an air passage defined at least in part by said projection and leading to said diaphragm chamber, a diaphragm in said diaphragm chamber having its periphery sealingly engaged between said interfacing surfaces, a flexible valve member in said valve chamber having its periphery held between said interfacing surfaces, a pressure sensing passage in said cover leading from the exterior of said housing to said diaphragm chamber, said diaphragm being interposed in said diaphragm chamber between said air passage and said pressure sensing passage, and operating means for moving said valve member relative to said valve seat in response to movement of said diaphragm.

2. The apparatus of claim 1, said housing having a generally annular valving surface surrounding and generally coplanar with said valve seat, said liquid inlet passage terminating in an inlet port surrounded by said valve seat, and said liquid outlet passage means including a plurality of outlet ports in said valving surface encircling said inlet port.

3. The apparatus of claim 2, each said outlet port having an increasing width in a radially outward direction.

4. The apparatus of claim 3, said cover defining a pressure control chamber adjacent said valve member opposite said valve seat and valving surface, and said operating means including means for raising and lowering the pressure in said pressure control chamber.

5. The apparatus of claim 4, a pilot passage in said cover leading from said pressure control chamber to the exterior of said housing, a pressure passage substantially more restricted than said pilot passage defined at least in part by said valve member and extending from said inlet port to said pressure control chamber, and said operating means including pilot valve means for opening and closing said pilot passage.

6. The apparatus of claim 5, a releasable hinge for hinging said cover and body together at a first location, and a fastener for holding said cover and body together at a second location.

7. The apparatus of claim 6, said operating means including a lever having a first end connected to said diaphragm, a second end supported by said fastener, and a pilot valve member supported by said lever intermediate its ends.

8. The apparatus of claim 2, an insert member in said valve chamber supported by said body, said valving surface and outlet ports being formed in said insert member.

9. The apparatus of claim 2, said body including a skirt-shaped annular wall inclined relative to the tank floor, and said water outlet passage means including outlet openings directed downwardly toward said skirt-shaped annular wall.

10. A fluid level control for use with a reservoir having a normally submerged inlet, said control comprising:
a housing including a body and a cover having interfacing surfaces;
a pair of spaced, aligned recesses in both said interfacing surfaces defining a valve chamber and a diaphragm chamber;
a diaphragm, and a lever attached to said diaphragm;
a flexible valve member;
the peripheries of said diaphragm and valve member being captured between said interfacing surfaces to hold said diaphragm and valve member in said diaphragm chamber and valve chamber;
said lever extending to the exterior of said housing from said diaphragm chamber and including a segment overlying said valve chamber;
a valve seat in said body integral with said body;
control means supported at least in part by said lever segment for controlling the movement of said valve member relative to said valve seat;
an integral projection of said body member adapted to extend through the reservoir inlet to support said housing within the reservoir;
a fluid inlet passage extending through said projection for communicating fluid to said valve chamber; and
a fluid outlet passage in said body for communicating fluid from said valve chamber.

11. The control of claim 10 further comprising means for hinging said body and cover together, and a fastener spaced from said hinge for holding said body and cover toogether.

12. The control of claim 11, means carried by said fastener for supporting said lever.

13. The control of claim 12, said lever supporting means being adjustable.

14. The control of claim 10, further comprising a conduit defined at least in part by said integral projection for venting said diaphragm chamber to atmosphere.

15. The control of claim 14, said integral projection being threaded to accept a nut for fastening said housing to the reservoir, said conduit including a notch in the threaded portion.

16. Apparatus for controlling the level of fluid in a reservoir, said apparatus comprising in combination:
a housing including a body member and a cover member having interfacing surfaces;
a fluid inlet and a fluid outlet in said housing;
aligned recess means in said body member and cover member defining cavity means;
valve means and valve operating means disposed at least in part within said cavity means for controlling the flow of fluid between said inlet and said outlet;
hinge means for pivotably interconnecting said body member and cover member at a first peripheral region; and
fastening means interconnecting said body member and cover member at a second peripheral region; said fastening means including means for supporting said valve operating means.

17. Apparatus as claimed in claim 16, said fastening means comprising a single screw member.

18. Apparatus as claimed in claim 16, said fastening means comprising a screw member including a first threaded portion, holding means engaged with said first threaded portion for holding said body member and cover member together, a second threaded portion of said screw member, and said supporting means for said valve operating means being engaged with said second threaded portion.

19. Apparatus as claimed in claim 18, said valve operating means comprising a lever, said supporting means including an adjustment element threaded on said second threaded portion, and spring means telescoped around said screw member and held in compression between said adjustment member and said lever.

20. Fluid level control apparatus for use with a fluid reservoir having a normally submerged fluid inlet opening, said apparatus comprising:
a housing having a projection adapted to be received in the reservoir inlet opening;
a fluid inlet passage extending through said projection and into said housing;
fluid outlet port means in said housing;
a valve chamber in said housing in communication between said inlet passage and said outlet port means;
a valve means in said valve chamber;
a diaphragm chamber in said housing;
a diaphragm dividing said diaphragm chamber into first and second portions;
means including said projection defining an air passage extending through the reservoir inlet opening for communicating the first diaphragm chamber portion with atmosphere;
a fluid pressure sensing passage in said housing extending from said second diaphragm chamber portion to the exterior of said housing; and
valve operating means coupled between said valve means and said diaphragm for operating said valve means in accordance with the pressure differential between fluid pressure and atmosphere;
said valve operating means including a lever connected to said diaphragm and extending from said diaphragm chamber through said fluid pressure sensing passage.

21. The apparatus of claim 20, further comprising an anti-spill element in said air passage, said element being air permeable and substantially fluid impermeable.

22. The apparatus of claim 21, said element being formed of non-hydrophilic porous plastic.

23. The apparatus of claim 20, said housing including a body and a cover having interfacing surfaces defining said diaphragm chamber therebetween, said diaphragm having a first peripheral lip captured between said interfacing surfaces, a second lip on said diaphragm disposed radially inwardly of said first lip and forming a mouth opening directed centrally of said diaphragm, said lever including a diaphragm engaging portion captured within said mouth opening.

24. The apparatus of claim 23, said diaphragm being spaced from said diaphragm engaging lever portion radially inwardly of said second lip to permit deflection of said diaphragm under pressure and contraction of said second lip against said diaphragm engaging lever portion.

25. A fluid level control valve comprising a housing defining an inlet passage adapted to communicate with a source of pressurized fluid, a valve seat surrounding the downstream end of said inlet passage, flow restricter means encircled by said valve seat to provide a flow path of predetermined size toward said valve seat, a plurality of outlet passages surrounding said valve seat, a valve member movable relative to said valve seat, control means movable between positions in response to fluid level changes, said control means being operatively coupled to said valve member for controlling the movement thereof between open and closed positions, means for limiting movement of said valve member to a full open position to define a flow path of predetermined size from said valve seat, and the improvement in accordance with which said inlet passage, said flow path toward said valve seat, said flow from said valve seat, and the aggregate of said outlet passages each provides a substantial and approximately equal restriction of fluid flow.

26. The valve of claim 25 wherein the smallest of said approximately equal restrictions is at least as large in area as two-thirds of the area of the largest said restriction.

27. A fluid control valve comprising a housing defining an inlet chamber adapted to be communicated with a source of pressurized fluid, a valve seat surrounding said inlet chamber, a valving surface surrounding said valve seat and lying generally in the plane of the valve seat, a plurality of outlet ports in said valve surface radially outward of and surrounding said valve seat, outlet passage means communicating with said outlet ports, a flexible valve member overlying said valve seat and outlet ports, a pressure control chamber overlying said valve member opposite said outlet ports and valve seat, and means for increasing and decreasing the pressure within said pressure control chamber for closing and opening the radial flow path from said inlet chamber across said valve seat to said outlet ports, at least the majority of said outlet ports increasing in width in the direction radially away from said valve seat.

28. The valve of claim 27, said housing including a body member, said valve seat and inlet chamber being defined by said body member, said body member including an annular outlet chamber surrounding said valve seat, and an insert member received in said outlet chamber, said valving surface being formed on said insert member.

29. The valve of claim 28, a cover member fixed to said body member, the radially outer peripheral portion of said valve member being claimed between said member and cover member.

* * * * *